Patented Nov. 7, 1944

2,361,994

UNITED STATES PATENT OFFICE 2,361,994

MANUFACTURE OF ESTERS

Frank O. Cockerille, Albemarle County, Va., assignor to E. I. du Pont de Nemours & Company, Wilmington, Del., a corporation of Delaware No Drawing. Application September 24, 1943,
Serial No. 503,656

4 Claims. (Cl. 260—498)

This invention relates to the manufacture of vinyl and ethylidene esters by reacting acetylene with a carboxylic acid, and more particularly this invention is concerned with improving the efficiency of these reactions.

When acetylene is interacted with acetic acid under suitable catalytic conditions, vinyl acetate is formed and in the presence of a large excess of acetic acid, a good deal of the vinyl acetate formed is at once converted into ethylidene diacetate which is also commercially useful. These reactions take place simultaneously and are governed by the composition of the acetic acid liquor, hereinafter termed "absorber liquor," through which the acetylene is passed and especially by the amount and type of catalyst, by the temperature, purity of acetylene, etc. However, under the most favorable conditions of operation as heretofore practiced, a substantial amount of undesirable side reactions take place chiefly to form high boiling polymeric compounds collectively termed "tars." Tar formation consumes acetic acid values which otherwise would result in the formation of the above mentioned useful products and it is, therefore, highly desirable that such tar formation should be reduced to a minimum.

My invention, therefore, has as its principal object the provision of an improved process for reacting acetylene with a carboxylic acid to form vinyl and ethylidene esters with a minimum formation of tar. The above and other objects will more clearly appear as the description develops.

I have found that the addition of a small amount of cacodyl oxide to the absorber liquor commonly used in the manufacture of vinyl and ethylidene carboxylic acid esters serves to greatly reduce tar formation.

Only a very small amount of the cacodyl oxide need be used to give a marked improvement in the reaction. For instance, I have found that as little as 0.001 mol per liter is very effective. The preferred range of concentrations is between about 0.0001 and 0.01 gram mol per liter of the absorber liquor.

The following examples are given to further illustrate this invention. Parts and percentage compositions are by weight unless otherwise indicated.

Example I

A reaction vessel equipped with an efficient agitator and a reflux condenser was charged with 445 parts of glacial acetic acid (M. P. 16.4° C.), 21.5 parts of 95% acetic anhydride, 1.0 part (0.007 mol per liter) of crystalline methanetrisulfonic acid trihydrate and 0.15 part (0.0013 mol per liter) of crude cacodyl oxide. The temperature of the mixed ingredients was raised to 85° C. ($\pm 5°$) while a slow stream of dried acetylene was passed over the surface to flush out inert gases. The agitator was started and acetylene passed in as needed. A solution containing 5% of mercuric acetate in glacial acetic acid was added, starting with 3 parts and continuing at intervals of several minutes with portions of 1 to 2 parts as required to maintain a satisfactory rate of absorption. A total of 50 parts of the mercuric acetate solution was used. Acetylene was passed in as needed to maintain a pressure of about one pound per square inch in excess of atmospheric, the rate of acetylene consumption being read from a flow meter at frequent intervals. After an induction period during which little absorption occurred, the rate increased rapidly, reaching a peak 15 minutes after agitation was started. The temperature has held between 90° and 95° C. during the absorption. The rate decreased gradually. The absorption was stopped and the mineral acidity neutralized by addition of excess anhydrous sodium acetate about one hour after the highest rate was attained. It was found that the product contained, after filtration to remove insoluble sludge and mercury compounds, only 0.5% non-volatile residues (tars) whereas a control run, from which the cacodyl oxide was omitted, yielded a product which contained 0.95% non-volatile residue.

Example II

A charge like that in Example I was prepared except that 500 parts of acetic acid were used and 5 parts of crystalline mercuric sulfate were added while the charge was being prepared. Operating temperatures and procedures were similar to those cited in Example I but no further mercury catalyst was required. After neutralizing and filtering, as indicated in Example I, the product was found to contain 0.6% non-volatile residue while a control run with mercuric sulfate, from which the cacodyl oxide was omitted, gave a product which contained 1.2% non-volatile residue.

It is understood, of course, that the above examples are merely for the purposes of illustration and my invention is not restricted to the exact conditions and agents disclosed in the examples but is susceptible to a wide variation which will be immediately obvious to persons skilled in the art. For example, the permissible range of pressure is that heretofore generally employed in the manufacture of vinyl and ethylidene esters. Furthermore, this invention is applicable in the formation of vinyl and ethylidene esters other than vinyl and ethylidene acetate specifically mentioned: vinyl propionate, vinyl butyrate, ethylidene dipropionate, ethylidene dibutyrate are but a few examples of other esters which may be prepared in accordance with my invention.

By the practice of this invention, the formation of tar is greatly reduced being in no case more than about half that normally obtained.

I claim:

1. In the manufacture of vinyl and ethylidene esters wherein acetylene is reacted with a carboxylic acid whereby to form said esters, the improvement which comprises reacting the acetylene and carboxylic acid in the presence of a small amount of cacodyl oxide.

2. In the manufacture of vinyl and ethylidene esters wherein acetylene is reacted with a carboxylic acid whereby to form said esters, the improvement which comprises reacting the acetylene and carboxylic acid in the presence of from about 0.0001 to about 0.01 gram mol of cacodyl oxide per liter of reaction mixture.

3. In the manufacture of vinyl acetate and ethylidene diacetate wherein acetylene is reacted with acetic acid, the improvement which comprises reacting the acetylene and acetic acid in the presence of a small amount of cacodyl oxide.

4. In the manufacture of vinyl acetate and ethylidene diacetate wherein acetylene is reacted with acetic acid, the improvement which comprises reacting the acetylene and acetic acid in the presence of from about 0.0001 to about 0.01 gram mol of cacodyl oxide per liter of reaction mixture.

FRANK O. COCKERILLE.